Patented July 14, 1953

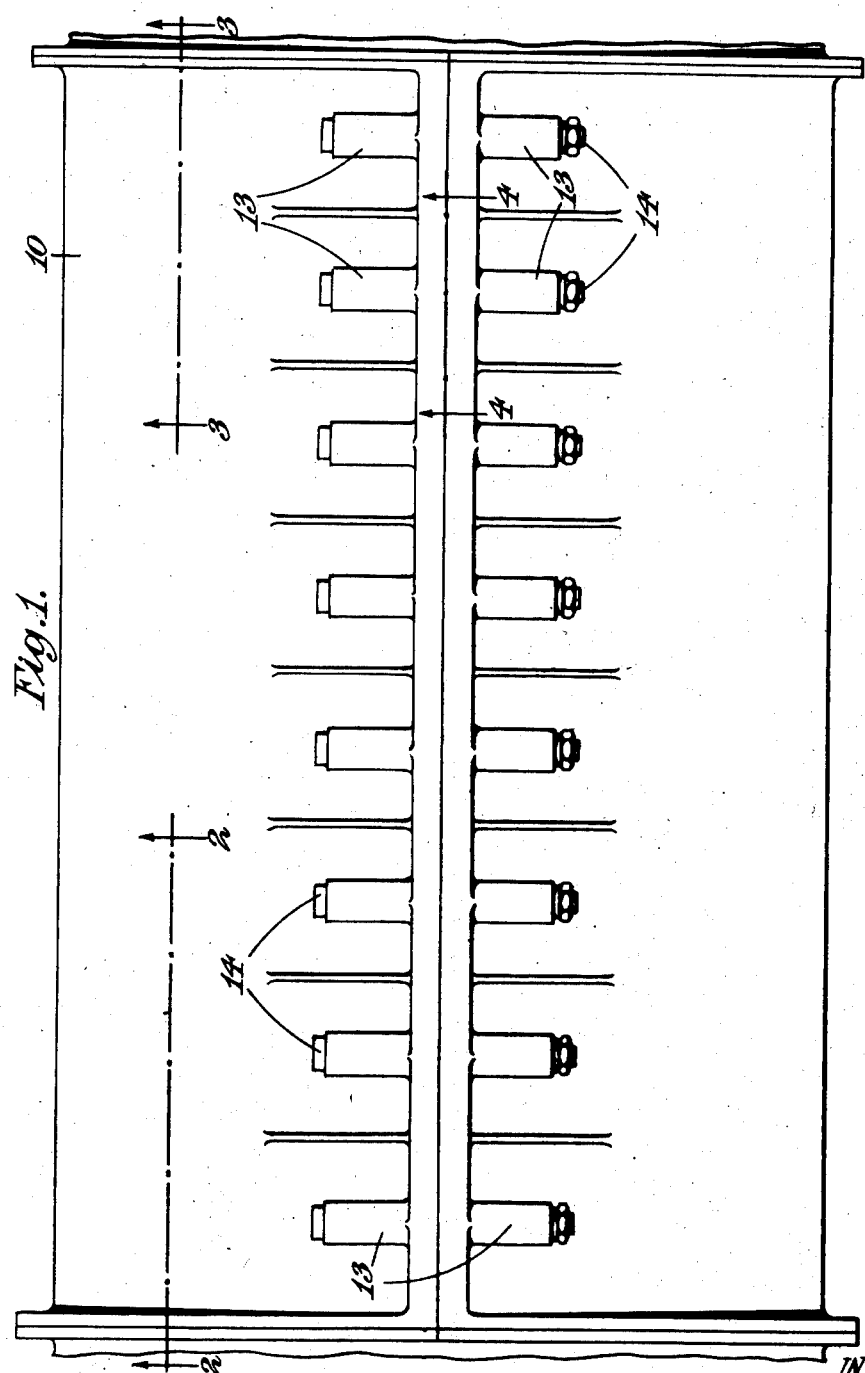

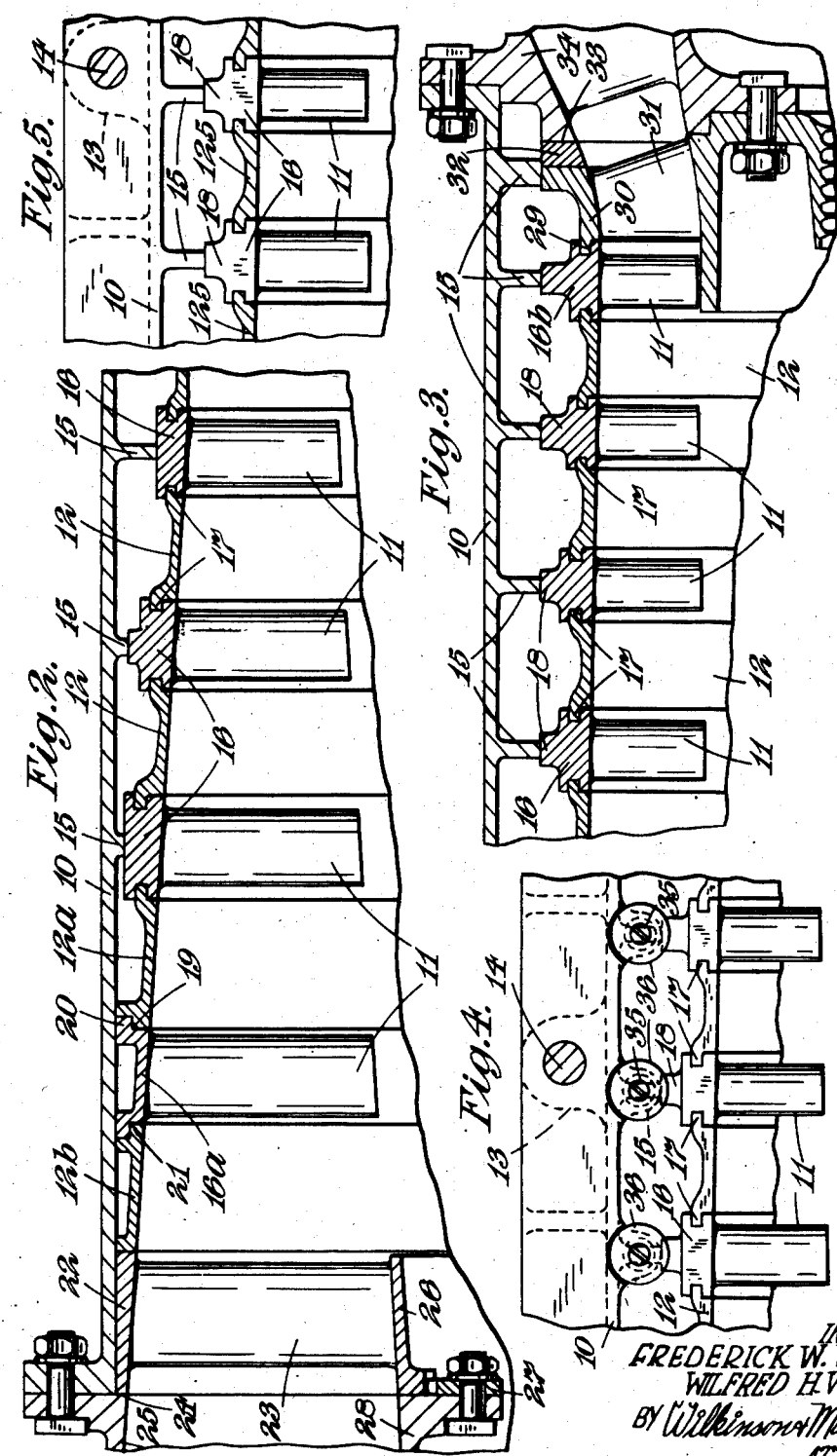

2,645,413

UNITED STATES PATENT OFFICE 2,645,413

STATOR FOR MULTISTAGE AXIAL COMPRESSORS

Frederick William Walton Morley, Aston-on-Trent, and Wilfred Henry Wilkinson, Old Normanton, England, assignors to Rolls-Royce Limited, Derby, England, a British company Application April 6, 1948, Serial No. 19,374
In Great Britain April 16, 1947

4 Claims. (Cl. 230—132)

This invention relates to multi-stage axial compressors, such, for instance, as are employed in gas-turbine engines.

This invention has for an object to provide an improved and reliable stator construction for such compressors whereby manufacture and assembly and dismantling of the stator is facilitated.

According to this invention, a stator for a multi-stage axial compressor comprises a tubular casing and a stator blade assembly which includes a set of circumferentially-disposed blades for each of a plurality of stages of the compressor and a spacer ring between adjacent sets of blades to retain them radially and axially, there being means to locate the stator-blade assembly coaxially within the casing.

According to a feature of this invention, the stator blades are formed with blade platforms extending axially and circumferentially of the casing and the axially-spaced edges of the platforms have interlocking engagement with the end surfaces of the spacer rings.

The blade-platforms and spacer rings conveniently spigot one with the other, for instance, through axially-directed, circumferential ribs on one part engaging in circumferential grooves on the other part.

In certain constructions according to the invention, the stator-casing and intermediate spacer-rings are split substantially diametrically, to facilitate assembly, whereby in effect each half section of the stator-assembly is built up separately, the spacer rings and/or blades being retained in the casing by means of suitable locating devices. In other constructions the compressor casing is not split and in this case the spacer ring may be of continuous circular section.

The invention further permits the use of a stator-casing construction having a relatively thin wall reinforced by webs or fins directed radially inwards from the wall of the casing, such webs being provided with inwardly facing circular surfaces curved about the axis of the casing, and serving to retain the spacer rings and/or the blades coaxially within the casing. In this manner it can be arranged that the strengthening webs and wall of the casing are at substantially the same temperature, thereby avoiding circumferential thermal stresses due to the presence of these webs; a further advantage is that the external surface of the casing may be formed without strengthening webs, and apart from external bosses may have a smooth surface which is attractive from the point of view of cleanliness and appearance.

According to another feature of this invention there is also provided means to retain the stator-blade assembly axially within the casing and to apply to the stator-blade assembly a predetermined axial load. This means may, for instance, comprise ring-like axial abutment for the stator-blade assembly at each end thereof, said abutments being capable of axial tightening on the casing, and a spacer element of predetermined axial thickness between one abutment and the stator-blade assembly.

There will now be described by way of example of this invention two stator arrangements for multi-stage axial compressors. The description refers to the accompanying diagrammatic drawings in which:

Figure 1 is an outside view of a multi-stage axial compressor,

Figures 2, 3 and 4 are partial radial sections taken on the lines 2—2, 3—3, 4—4 respectively of Figure 1 and Figure 5 is a view corresponding to Figure 4 of an alternative construction.

The compressor rotor has been omitted from all figures of the drawings for the sake of clarity.

Referring to Figures 1 to 4, the compressor stator comprises a casing 10, a number of sets of stator blades 11 and a series of spacer rings 12 between the sets of stator blades 11.

The casing 10 is split substantially diametrically as will be seen from Figure 1, is substantially cylindrical in form and is substantially free from protuberances on its outer surface, there being bosses 13 provided adjacent the division to receive the clamping bolts 14 for securing the casing halves together. The casing may be provided externally with engine-mounting lugs and connections for bleeding-off air from the compressor.

Internally the casing 10 is provided with a series of axially-spaced, radially-directed strengthening webs 15 which also serve to locate the stator-blade assembly radially in the casing as described below. This arrangement of the strengthening webs enables the webs and wall of the casing to be maintained at substantially the same temperature thereby avoiding thermal stresses which normally develop when external webs are provided.

The stator-blade assembly comprises the sets of stator-blades 11 and the spacer rings which constitute shroud rings for the rotor blading. Each blade 11 comprises a mounting platform 16 at its root end and in all the stages, except the first and second stage stator blades, the platforms are circumferentially-grooved for spigotting on axially—and circumferentially—directed ribs 17 on the spacer rings 12. The blade platforms 16 co-operate with the strengthening webs 15 either directly or through outwardly-directed ribs 18 on the platform. The engaging surfaces of the platforms 16 or ribs 18 and the webs 15 are machined about the compressor axis so that the stator blade assembly is thereby positioned co-axially within the casing 10. The radial length of the ribs 18 and webs 15 are chosen so that the throat of the compressor converges from the inlet end to the outlet end.

The spacer ring 12a (Figure 2) engages by one of its axially-spaced edges in the platforms 16 of the set of blades 11 on its outlet side and is formed with an axial flange 19 to engage below a complementary flange 20 on the platforms 16a of the preceding set of blades 11. The first spacer ring 12b is formed on its outlet edge with an axial flange 21 to engage with the platforms 16a in a similar manner, and is plain at its inlet edge to abut an outer support ring 22 of the inlet guide vanes 23. The outer support ring 22 abuts at its inlet edge against a shoulder 24 formed by the outlet wall of the compressor inlet duct 25 which is bolted to the casing 10. The inner support ring 26 of the blades 23 has a splined engagement with a ring 27 bolted to the inner wall 28 of the compressor inlet duct.

The outlet edge of the platforms 16b of the last set of stator blades 11 spigots on a circumferential rib 29 on the outer support ring 30 of the outlet guide vanes 31 and this support ring 30 abuts through a washer-like spacer element 32 on a shoulder 33 in the outlet duct 34 which is bolted to the casing 10.

From the foregoing description it will be seen that the stator-blade assembly is located axially within the casing 10 by the shoulders 24 and 33 and is located radially within the casing by the webs 15 and also that the blades 11 are spaced axially and retained in their correct radial positions by the spacer rings 12.

The spacer rings 12 in this construction are semi-circular and the halves of the stator are built up separately and joined together. To retain the blades 11 and spacer rings in position in the halves of the stator casing, an arrangement such as is illustrated in Figure 4 can be used. The webs 15 are formed in the region of the split with swellings which are tapped to receive set screws 35 for retaining washers 36 in position. These washers are arranged to overlap the end faces of the platforms of the last blades 11 of each stage in the half of the casing, thereby retaining them in position. The platforms 16 and webs 15 are recessed slightly to accommodate the washers 36 so that they do not stand proud of the joint surfaces between the casing halves.

It will be appreciated that assembly of the stator is greatly facilitated since it is merely necessary to place alternately in position a set of stator blades and a spacer ring until the required number of stages of blading is assembled. The two halves of the stator are then bolted together and on bolting the inlet and outlet ducts 25, 34 in position the whole stator-blade assembly is correctly positioned.

The axial thickness of the washer-like spacer element 32 is selected to give a desired axial load to the stator-blade assembly.

Instead of forming the spacer rings 12 in halves as above described, they may as indicated in Figure 5 be formed as complete rings 125 and in this case the complete stator-blade assembly is either built-up in one half of the casing 10 and the other half then bolted in position on it, or the casing 10 is not divided as above described and the stator-blade assembly is built-up within the casing by feeding the successive sets of stator-blades and spacer rings into the casing from one end. In such a method of assembly it will of course be necessary to interpose rotor discs supporting the moving blading; for example the rotor construction may comprise a number of rotor discs in splined engagement with a central rotor shaft, and the assembly involves building up a stage of stator blades between adjacent spacer rings, inserting a rotor disc, assembling the succeeding stage of stator blading with a further spacer ring, inserting the next rotor disc etc.

The annular spaces formed between the spacer rings 12, casing 10 and the webs 15 may, if desired, be employed for bleeding the compressor.

If desired moreover the casing 10 may be provided internally with webs, such as webs 15, to engage the spacer rings 12.

We claim:

1. A stator for a multi-stage axial-flow compresser comprising a tubular casing; and within the tubular casing an assembly comprising a plurality of sets of stator blading, each set comprising a plurality of blading elements each having at its root end a blade platform which extends axially and circumferentially of the casing, said platforms together forming a substantially continuous ring at the roots of the blading elements, and a plurality of spacer rings each of said spacer rings being removable from within said tubular casing and separate therefrom, being located between the sets of stator blading and having axially directed faces abutting the axially-directed faces of the platforms of the sets of stator blading to hold the sets in axially spaced relation, inter-engaging means on the abutting axially-directed faces of the platforms and the adjacent spacer rings to locate the blading elements and spacer rings radially of one another; and axial abutment means between the assembly and tubular casing to locate the said assembly of sets of stator blading and removable spacer rings axially with respect to the tubular casing, and radial abutment means to locate said assembly coaxially within the tubular casing.

2. A stator as claimed in claim 1, wherein the abutment means to locate said assembly formed by said sets of stator blading and said removable spacer rings coaxially within the tubular casing comprises internal inwardly-directed webs on the tubular casing having curved surfaces coaxial with the tubular casing, which webs locate the assembly through abutment of said curved surfaces with said assembly.

3. A stator as claimed in claim 1, wherein the abutment means to locate said assembly axially with respect to said tubular casing comprises a pair of members each arranged to afford an axially-facing shoulder, said members being secured to said tubular casing one at each end thereof and one of said members at least being capable of axial tightening movement into abutment with the end of the casing, said assembly abutting against the shoulder afforded by one of said members, and a spacer member interposed between the other end of said assembly and the shoulder afforded by the second of said members, said axially-tightenable member being tightened into axial abutment with the end of the tubular casing to apply an axial load through said spacer member to said assembly.

4. A stator as claimed in claim 1, wherein the said abutment means comprises ring-like axial abutments for the assembly at each end thereof, a spacer element of predetermined axial thickness between one abutment and one end of the assembly, and means for tightening the abutments axially on the tubular casing.

FREDERICK WILLIAM WALTON MORLEY.
WILFRED HENRY WILKINSON.

References Cited in the file of this patent

UNITED STATES PATENTS

| Number | Name | Date |
|---|---|---|
| 990,321 | Westinghouse | Apr. 25, 1911 |
| 995,358 | Lieber | June 13, 1911 |
| 2,220,616 | Roder | Nov. 5, 1940 |
| 2,247,387 | Johnson et al. | July 1, 1941 |
| 2,452,782 | McLeod et al. | Nov. 2, 1948 |
| 2,461,242 | Soderberg | Feb. 8, 1949 |
| 2,497,151 | Clark | Feb. 14, 1950 |
| 2,543,355 | Davis | Feb. 27, 1951 |
| 2,610,786 | Howard | Sept. 16, 1952 |